(12) United States Patent
Sakurai (10) Patent No.: US 10,084,932 B2
(45) Date of Patent: Sep. 25, 2018

(54) INFORMATION PROCESSING APPARATUS, SERVER DEVICE, AND IMAGE FORMING SYSTEM FOR ADDING IDENTIFICATION INFORMATION

(71) Applicant: FUJI XEROX CO., LTD., Tokyo (JP)

(72) Inventor: Kazuhiko Sakurai, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/497,727

(22) Filed: Apr. 26, 2017

(65) Prior Publication Data

US 2018/0048782 A1 Feb. 15, 2018

(30) Foreign Application Priority Data

Aug. 12, 2016 (JP) .................. 2016-158585

(51) Int. Cl.
*H04N 1/00* (2006.01)
*H04N 1/32* (2006.01)

(52) U.S. Cl.
CPC ..... *H04N 1/00973* (2013.01); *H04N 1/00344* (2013.01); *H04N 1/00933* (2013.01); *H04N 1/32101* (2013.01); *H04N 2201/0094* (2013.01); *H04N 2201/3218* (2013.01); *H04N 2201/3221* (2013.01)

(58) Field of Classification Search
CPC ........... H04N 1/00973; H04N 1/00344; H04N 1/00933; H04N 1/32101; H04N 2201/0094; H04N 2201/3218; H04N 2201/3221
See application file for complete search history.

(56) References Cited

U.S. PATENT DOCUMENTS

| | | | | |
|---|---|---|---|---|
| 5,220,674 A | * | 6/1993 | Morgan | G06F 3/1203 358/1.11 |
| 6,654,137 B1 | * | 11/2003 | Yagita | G06K 15/002 358/1.1 |
| 2004/0036908 A1 | * | 2/2004 | Yagita | G06F 3/121 358/1.15 |
| 2006/0238797 A1 | * | 10/2006 | Berglin | G06F 3/1205 358/1.15 |
| 2012/0170065 A1 | | 7/2012 | Ohashi | |

FOREIGN PATENT DOCUMENTS

| | | |
|---|---|---|
| JP | 2010-218499 A | 9/2010 |
| JP | 2012-141888 A | 7/2012 |

* cited by examiner

*Primary Examiner* — Thomas D Lee
(74) *Attorney, Agent, or Firm* — Oliff PLC (57) ABSTRACT

An information processing apparatus including a receiving unit that receives a setting for image formation of an image forming apparatus, an addition unit that adds identification information to the setting when the setting has been received in a time period during which it is impossible to communicate with the image forming apparatus, a transmitter that transmits an instruction of the image formation and the setting to the image forming apparatus, and a notifying unit that notifies that the setting has been received in the time period, when the identification information has been added to the setting that the transmitter is to transmit.

6 Claims, 6 Drawing Sheets

| SETTING ITEMS | VALUE | 122 |
|---|---|---|
| OFFLINE | ○ | |
| USING TRAY | ... | |
| PAPER SIZE | ... | |
| COLOR | ... | |
| PAPER IMPOSITION | ... | |
| ... | ... | |

INFORMATION PROCESSING APPARATUS, SERVER DEVICE, AND IMAGE FORMING SYSTEM FOR ADDING IDENTIFICATION INFORMATION

CROSS-REFERENCE TO RELATED APPLICATIONS

This application is based on and claims priority under 35 USC 119 from Japanese Patent Application No. 2016-158585 filed Aug. 12, 2016.

BACKGROUND

Technical Field

The present invention relates to an information processing apparatus, a server device, and an image forming system.

SUMMARY

According to an aspect of the invention, an information processing apparatus includes:

a receiving unit that receives a setting for image formation of an image forming apparatus;

an addition unit that adds identification information to the setting when the setting has been received in a time period during which it is impossible to communicate with the image forming apparatus;

a transmitter that transmits an instruction of the image formation and the setting to the image forming apparatus; and a notifying unit that notifies that the setting has been received in the time period, when the identification information has been added to the setting that the transmitter is to transmit.

BRIEF DESCRIPTION OF THE DRAWINGS

Exemplary embodiments of the present invention will be described in detail based on the following figures, wherein.

DETAILED DESCRIPTION

1. Exemplary Embodiment 1-1. Entire Configuration of Image Forming System

Figure 1:
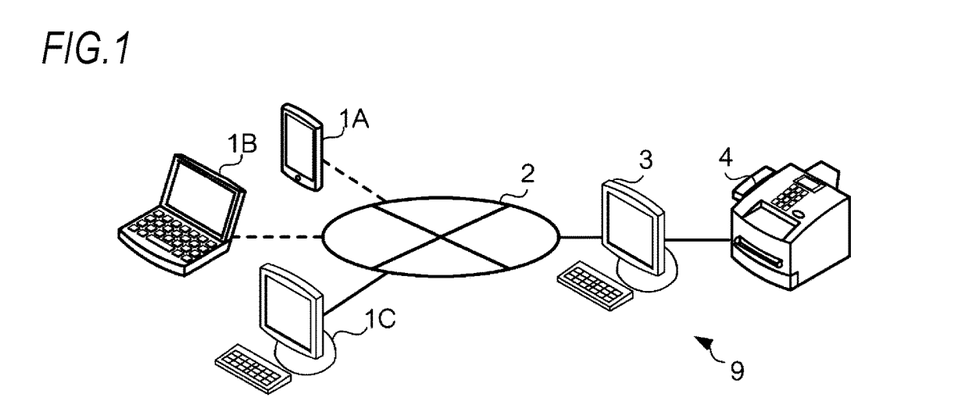
FIG. 1 is a view illustrating an entire configuration of an image forming system of an exemplary embodiment of the invention.

FIG. 1 is a view illustrating an entire configuration of an image forming system 9 according to an exemplary embodiment of the invention. The image forming system 9 includes a communication line 2 forming a local area network (LAN), plural terminals 1 and a server device 3 which are connected to the communication line 2, and an image forming apparatus 4 connected to the server device 3.

The plural terminals 1 illustrated in FIG. 1 are terminals 1A, 1B, and 1C. Each terminal 1 is an information processing apparatus configured to communicate with the image forming apparatus 4 via the communication line 2 and the server device 3. The image forming system 9 may include one terminal 1 rather than plural terminals 1. The terminal 1 communicates with the image forming apparatus 4 via the communication line 2 and the server device 3 to acquire information of a status of image formation of the image forming apparatus 4.

The image forming apparatus 4 has an image forming function (a printer) to form an image on a medium such as paper based on image data. The image forming apparatus 4 forms an image by, for example, an electrophotographic process, a thermal transfer process, or an inkjet process.

The image forming apparatus 4 may have an image reading function (a scanner) to optically read an image formed on a medium such as paper. Further, the image forming apparatus 4 may have an image sending function (a facsimile) to send image data to another device by using a public phone line (not illustrated).

1-2. Configuration of Terminal

Figure 2:
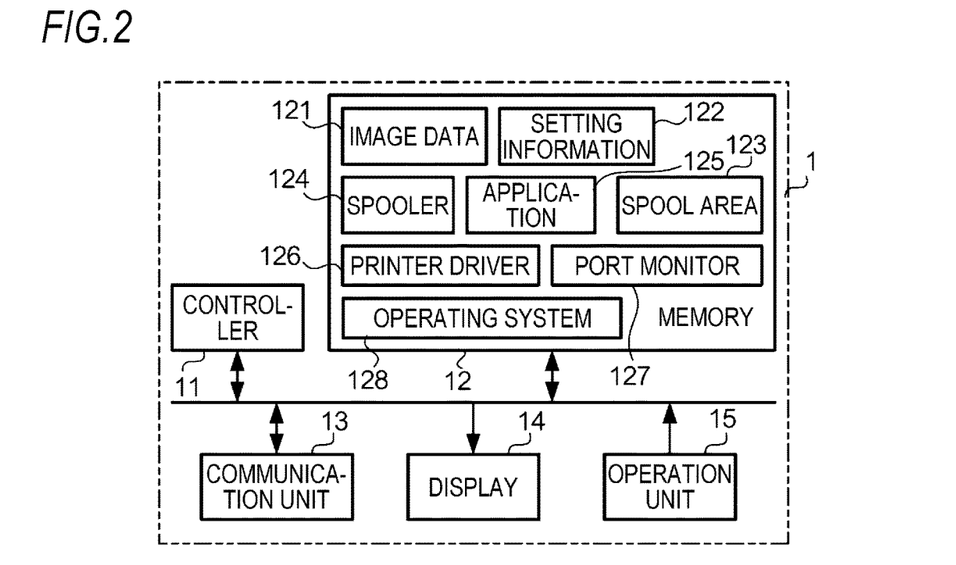
FIG. 2 is a view illustrating an exemplary configuration of a terminal.

FIG. 2 is a view illustrating an exemplary configuration of the terminal 1. The terminal 1 includes a controller 11, a memory 12, a communication unit 13, a display 14, and an operation unit 15.

The controller 11 includes a central processing unit (CPU), a read only memory (ROM), and a random access memory (RAM) and controls the respective units of the terminal 1 in the manner that the CPU reads and executes a computer program (hereinafter, simply referred to as a "program") stored in the ROM or the memory 12.

The communication unit 13 is a communication circuit connected to the communication line 2 via a wireless access point by a scheme based on, for example, IEEE 802.11. Without being limited to the wireless manner, the communication unit 13 may be connected to the communication line 2 in a wired manner. The terminal 1 exchanges information with the server device 3 and the image forming apparatus 4 by the communication unit 13 via the communication line 2. In addition, the terminal 1 may not necessarily exchange information with the image forming apparatus 4, and for example, may acquire a result of information exchange executed between the server device 3 and the image forming apparatus 4, from the server device 3.

The operation unit 15 includes operation tools such as operation buttons or a touch panel for inputting various instructions and receives an operation by a user to provide a signal corresponding to the operation contents to the controller 11.

The display 14 includes a liquid crystal display and displays, for example, various information instructed by the controller 11. The touch panel of the operation unit 15 may be disposed to be superimposed on the liquid crystal display of the display 14. In this case, the touch panel is made of a transparent material such that an image displayed on the liquid crystal display of the display 14 is viewed from a user.

The memory 12 is a large-scale memory such as a solid-state drive (SDD) and stores various programs to be read by the CPU of the controller 11. In addition, as illustrated in FIG. 2, the memory 12 stores image data 121 and setting information 122. In addition, the memory 12 has a spool area 123 that stores the image data 121 and the setting information 122 set for the image data 121 in association with each other.

The programs stored in the memory 12 are, for example, a spooler 124 that manages the spool area 123, an application 125 as an application program that receives an instruction of image formation from a user, an operating system 128 that is used to control the terminal 1, a printer driver 126 equipped in the operating system 128 in order to execute a setting of the image forming apparatus 4 according to the instruction of image formation, and a port monitor 127 that transmits a set of the image data 121 and the setting information 122 which are stored in the spool area 123 to the server device 3 when the instruction of image formation for the set is made.

The image data 121 is data representing an image, and for example, image data representing an image in a vector format. The vector format is a format in which a form drawn in an image is represented by, for example, plural functions or parameters.

The image data 121 is selected by a user, and when the setting information 122 indicating a setting corresponding to the image data 121 is input, the image data 121 and the setting information 122 are stored in the spool area in association with each other. When the image data 121 is represented in the vector format, the image data 121 may be converted into a raster format before being stored in the spool area. The raster format is a format in which an image is represented by a tone of pixels arranged in a grid pattern.

In addition, the terminal 1 may not store the image data 121 in the memory 12. In this case, the terminal 1 may suggest information that indicates a storing place of image data and may be acquired via the communication line 2, to the server device 3 or the image forming apparatus 4 so as to cause the server device 3 or the image forming apparatus 4 to acquire the image data.

The setting information 122 is information indicating a setting when an image is formed by the image forming apparatus 4, and includes contents corresponding to an operation of a user received by the operation unit 15.

Figure 3:
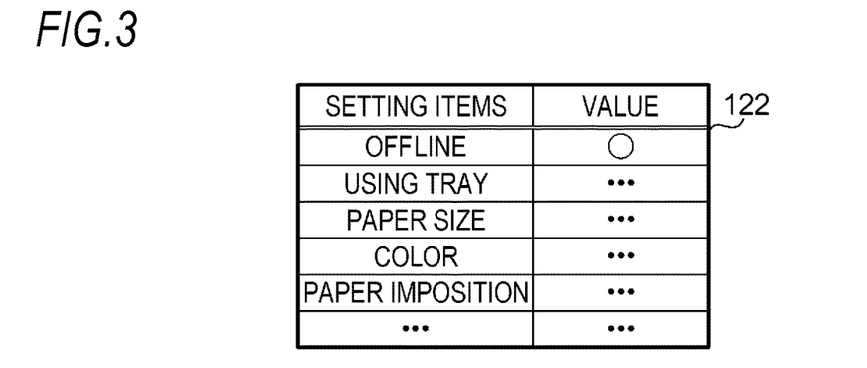
FIG. 3 is a view illustrating an example of setting information.

FIG. 3 is a view illustrating an example of the setting information 122. In the setting information 122, a value is set for each of plural setting items. Of the setting items, "OFFLINE" is an item indicating information for identifying whether a setting has been received in a time period during which the terminal 1 is unable to communicate with the image forming apparatus 4 via the server device 3. "OFFLINE" indicates a state where the terminal 1 and the server device 3 or the image forming apparatus 4 are unable to communicate with each other. For example, when a value of the item "OFFLINE" is "o", it means that a setting has been received in an offline time period, that is, in a time period during which it is impossible to communicate with the image forming apparatus 4. The value of the offline is not determined directly by an operation of a user but is determined by whether the terminal 1 is unable to communicate with the image forming apparatus 4 or the server device 3, that is, whether the acquiring unit 115 is unable to acquire desired information from the server device 3, at the time when an operation is performed.

The setting items other than "OFFLINE" are items applied when an image indicated by designated image data 121 is formed in the image forming apparatus 4. For example, "USING TRAY" is a setting for determining from which container a medium (e.g., paper) on which an image is formed is to be supplied. "PAPER SIZE" is a setting for determining the size of paper on which an image is formed. "COLOR" is a setting for a color tone, and for example, a color palette used when an image is formed, or various parameters for a development such as an amount of a developer or a voltage applied to an image carrier. "PAGE IMPOSITION" is a setting for forming an image by integrating plural pages on one page.

Status information of the image forming apparatus 4 is necessary to execute detailed settings of the setting items. For example, in the image forming apparatus 4, a container which is placed outside or accommodates no paper is unavailable. When a container is newly added, the container cannot be selected unless information of the container exists. In addition, an image which is formed on a medium by the image forming apparatus 4 may change in a color tone depending on, for example, the weather, humidity, and a deterioration state of a developing device. In order to reduce the fluctuation, an adjustment of the color tone may be performed by regularly forming a test image in the image forming apparatus 4 and causing the image forming apparatus to read the image.

Since the status information of the image forming apparatus 4 may not be obtained in the offline time period, the terminal 1 sets a predetermined value or a value selected by a user from a determined value range, for a setting item that requires the status information as described above.

1-3. Configuration of Server Device

Figure 4:
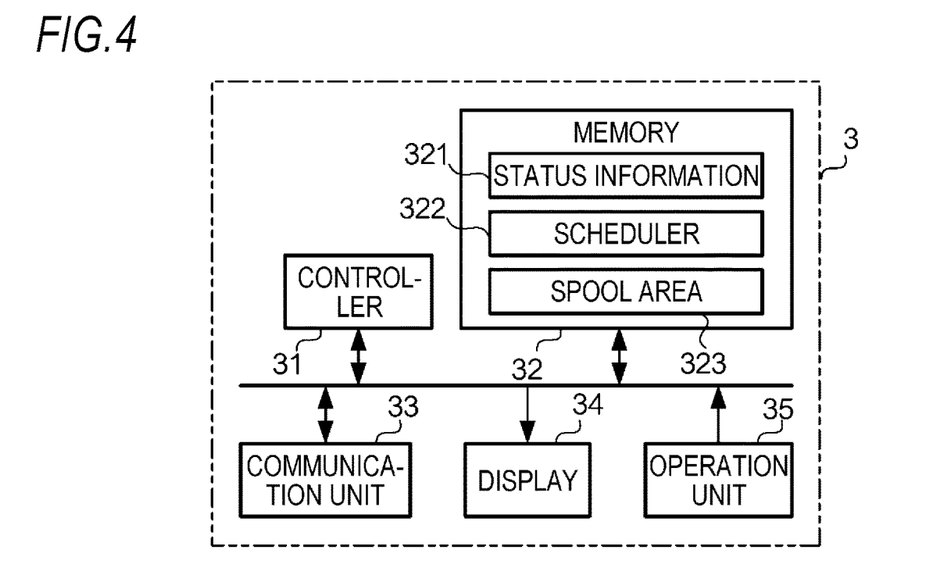
FIG. 4 is a view illustrating an exemplary configuration of a server device.

FIG. 4 is a view illustrating an exemplary configuration of the server device 3. A controller 31 includes a CPU, a ROM, and a RAM and controls the respective units of the server device 3 in the manner that the CPU reads and executes programs stored in the ROM or a memory 32.

A communication unit 33 is a communication circuit that is connected to the communication line 2 in a wired or wireless manner. The server device 3 exchanges information with the terminal 1 by the communication unit 33 via the communication line 2. In addition, the communication unit 33 has a function to communicate directly with the image forming apparatus 4. The controller 31 of the server device 3 communicates with the image forming apparatus 4 via the communication unit 33 so as to cause the image forming apparatus 4 to form a designated image.

An operation unit 35 includes operation tools such as operation buttons or a touch panel for inputting various instructions and receives an operation by a user to provide a signal corresponding to the operation contents, to the controller 31.

A display 34 includes a liquid crystal display and displays, for example, various information instructed by the controller 31. The touch panel of the operation unit 35 may be disposed to be superimposed on the liquid crystal display of the display 34. In this case, the touch panel may be made of a transparent material.

The memory 32 is a large-scale memory such as a hard disk drive and stores a program read by the CPU of the controller 31. In addition, as illustrated in FIG. 4, the memory 32 stores status information 321 and a scheduler 322, and has a spool area 323 that stores an instruction of image formation transmitted from the terminal 1.

The status information 321 is information indicating a status of the image forming apparatus 4. The server device 3 communicates with the image forming apparatus 4 to acquire the status information 321 and store the information in the memory 32.

The scheduler 322 is a program that reads, from the spool area 323, the instruction of the image formation transmitted from the terminal 1, determines a sequence for executing the instruction, and executes a process of the instructed image formation according to the sequence.

1-4. Functional Configuration of Image Forming System

Figure 5:
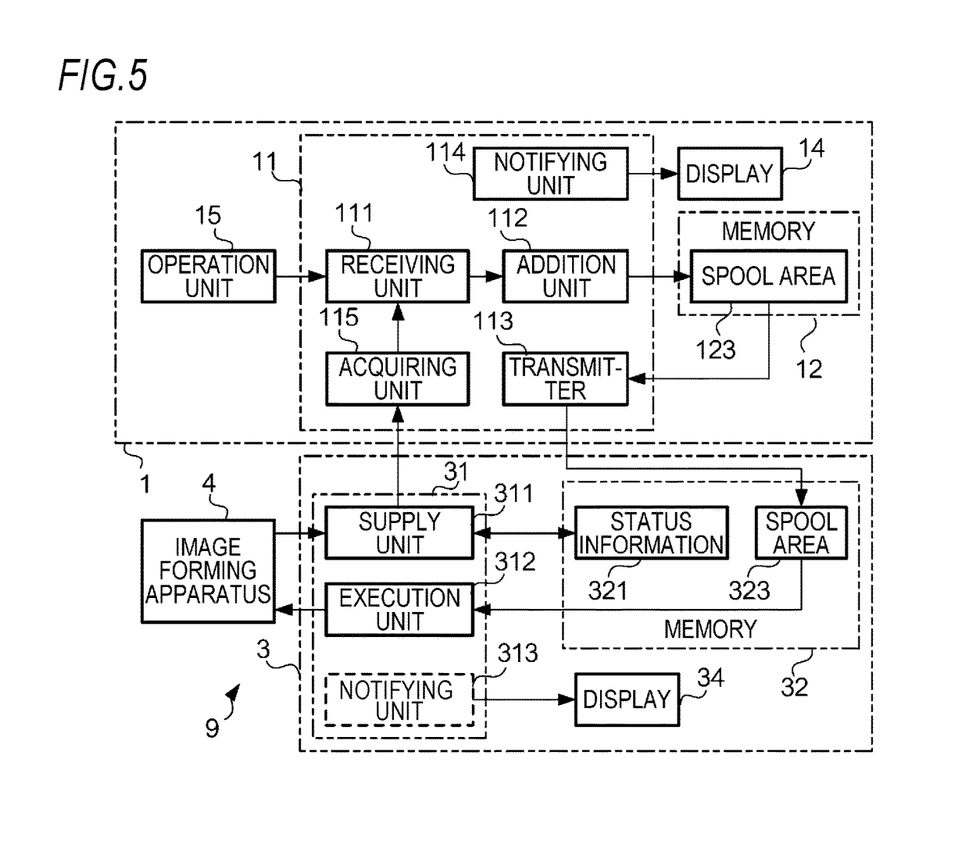
FIG. 5 is a view illustrating an exemplary functional configuration of the image forming system.

FIG. 5 is a view illustrating an exemplary functional configuration of the image forming system 9. The controller 11 of the terminal 1 functions as a receiving unit 111, an addition unit 112, a transmitter 113, a notifying unit 114, and an acquiring unit 115 by executing various programs (see FIG. 2) such as the spooler 124, the application 125, the printer driver 126, and the port monitor 127 which are read from the memory 12.

The receiving unit 111 is a function that is implemented, for example, when the controller 11 executes the application 125, and receives a setting for image formation of the image forming apparatus 4. A user of the terminal 1 selects the image data 121 (not illustrated in FIG. 5) of an image that the user desires to form and inputs a setting for the image formation by operating the operation unit 15. The receiving unit 111 specifies the image data 121 selected by the user using the operation unit 15 and generates the setting information 122 (not illustrated in FIG. 5) indicating a setting input for the image represented by the image data 121.

The addition unit 112 is a function that is implemented, for example, when the controller 11 executes a program such as the printer driver 126. When a setting for image formation has been received by the receiving unit 111 in the time period during which the terminal 1 is unable to communicate with the image forming apparatus 4, the addition unit 112 adds identification information to the setting. The identification information to be added is, for example, the value "o" for the setting item "OFFLINE" illustrated in FIG. 3. When the setting has been received in a time period other than the offline time period (hereinafter, referred to as an "online time period"), the addition unit 112 sets the value for the setting item "OFFLINE" in the setting to a value other than "o".

Not only the setting information 122 indicating the setting to which the identification information has been added by the addition unit 112, but also the setting information 122 indicating the setting to which the setting information has not been added are stored in the spool area 123 in association with the target image data 121.

The transmitter 113 is, for example, a function that is implemented when the controller 11 executes the port monitor 127. The transmitter 113 reads a set of an instruction of image formation and a setting for the image formation which are received from a user, from the spool area 123 and transmits the set to the server device 3 and the image forming apparatus 4 via the server device 3.

The notifying unit 114 is, for example, a function that is implemented when the controller 11 executes a program such as the printer driver 126. When identification information has been added to a setting that the transmitter 113 is to transmit, the notifying unit 114 notifies that the setting has been received in the offline time period. This notification is, for example, displayed on the display 14.

The controller 31 of the server device 3 functions as a supply unit 311 and an execution unit 312 by executing a program such as the scheduler 322 read from the memory 32.

When a request is received from the terminal 1, or a predetermined condition is met, the supply unit 311 inquires the status from the image forming apparatus 4 to acquire information, and generates status information 321 to store the information in the memory 32. In addition, the supply unit 311 supplies the status information 321 to the terminal 1. The acquiring unit 115 acquires the information supplied from the supply unit 311.

The execution unit 312 is, for example, a function that is implemented when the controller 31 executes the scheduler 322. The execution unit 312 reads a set of an instruction of image formation and a setting for the image formation which are transmitted from the terminal 1, from the spool area 323, and executes a process of the image formation indicated by the instruction according to a determined sequence.

In addition, the controller 31 may function as a notifying unit 313 indicated by a dashed line in FIG. 5. In this case, when the setting to which the identification information has been added is transmitted from the terminal 1, the notifying unit 313 notifies that the setting has been received in the offline time period. This notification is, for example, displayed on the display 34.

1-5. Operation of Image Forming System

Figure 6A:
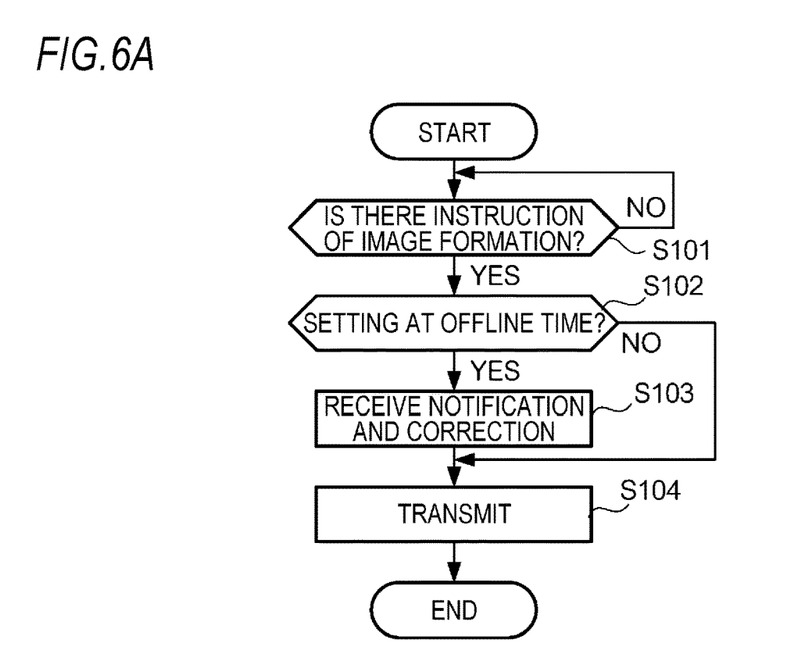
FIGS. 6A and 6B are flowcharts illustrating a flow of an operation of the image forming system.
Figure 6B:
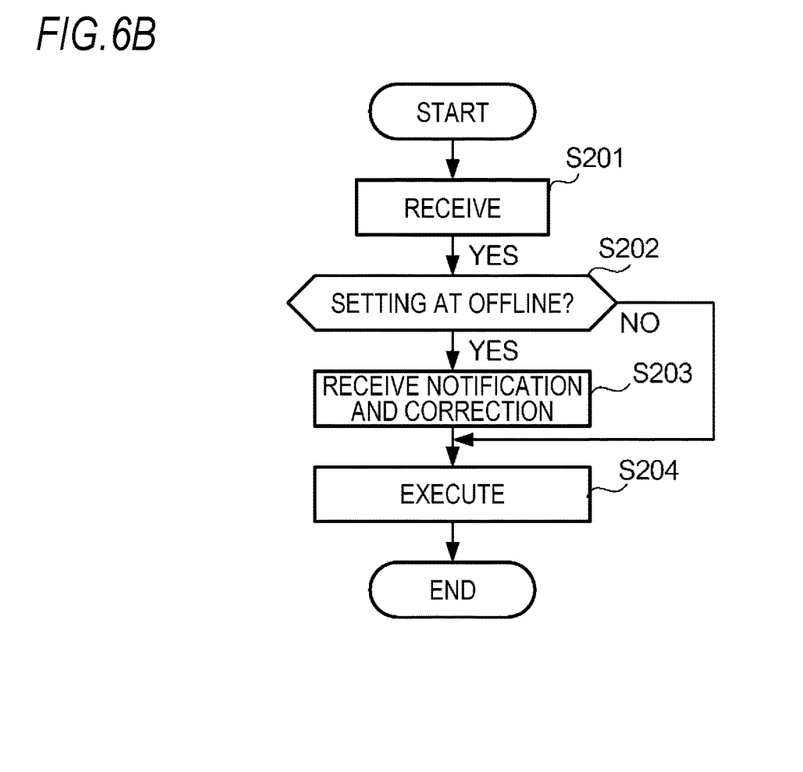

FIGS. 6A and 6B are flowcharts illustrating a flow of an operation of the image forming system 9. FIG. 6A illustrates an operation of the controller 11 of the terminal 1 in the image forming system 9. The controller 11 determines whether there is an instruction of image formation received from a user (step S101), and continues the determination while determining that there is no instruction of image formation (step S101; NO). When it is determined that there is an instruction of image formation (step S101: YES), the controller 11 determines whether a setting associated with the instruction has been received in the offline time period (step S102).

When it is determined that the setting associated with the instruction of the image formation has been received in the offline time period (step S102: YES), the controller 11 notifies the user that the setting has been received in the offline time period, by the display 14. After the notification, the controller 11 receives a correction to the setting (step S103), and the process proceeds to step S104. When it is determined in step S102 that the setting has not been received in the offline time period (step S102: NO), the controller 11 does not execute step S103, and the process proceeds to step S104.

In step S104, the controller 11 transmits the instruction of the image formation and the setting associated with the instruction to the server device 3 (step S104). Specifically, the controller 11 transmits the set of the image data 121 and the setting information 122 stored in the spool area 123 to the server device 3 via the communication unit 13 and the communication line 2.

FIG. 6B illustrates an operation of the controller 31 of the server device 3 in the image forming system 9. The controller 31 receives the set of the image data 121 and the setting information 122 transmitted from the terminal 1 and stores the set in the spool area 323 (step S201), and determines whether the setting has been received in the offline time period (step S202).

When it is determined that the setting has been received in the offline time period (step S202: YES), the controller 31 notifies the user that the setting has been received in the offline time period, by the display 34. After the notification, the controller 31 receives a correction to the setting (step S203), and the process proceeds to step S204. When it is determined that the setting has not been received in the offline time period (step S202: NO), the controller 31 does not execute step S203 and the process proceeds to step S204.

In step S204, the controller 31 causes the image forming apparatus 4 to execute a process of the instructed image formation by using the setting associated with the instruction (step S204). Specifically, the controller 31 transmits a set of a copy of the image data 121 and a copy of the setting information 122 which are stored in the spool area 323, to the image forming apparatus 4 via the communication unit 33. The image forming apparatus 4 to which the set has been transmitted forms the image represented by the image data included in the set on a medium such as paper by using the setting included in the set.

In a case where a necessity or an unnecessity for a confirmation of a print condition is determined in accordance with whether a file is acquired from an external device, the confirmation may be required only for the reason that the file is acquired from an external device even though the print condition for the file complies with the intention of the user. Further, in this case, the confirmation may not be required only for the reason that the file is not acquired from an external device even though the print condition does not adapt to the status of the printing device.

In addition, in a technology in which printing data is sent to the image forming apparatus once, and a notification of a process result is received so as to change print parameters, a process load of the image forming apparatus is high, and various unnecessary processes such as a printing are required to be executed.

In the image forming system 9 according to the exemplary embodiment of the present invention, since the setting for the image formation that has been received in the offline time period is urged to be corrected, a user has an opportunity to correct the setting made when the status of the image forming apparatus is not identified.

2. Modifications

The exemplary embodiment of the invention has been described, and the contents of the exemplary embodiment may be modified as follows. In addition, the modifications described below may be combined with each other.

2-1. Modification 1

In the above-described exemplary embodiment, one piece of setting information 122 is associated with one image formation, and the setting information 122 includes the plural setting items. Alternatively, one setting item may be associated with one image formation.

In addition, in the above-described exemplary embodiment, one piece of setting information 122 includes one piece of identification information indicating whether the setting has been received in the offline time period. Alternatively, the identification information may be added to each of the setting items constituting the setting information 122.

Figure 7:
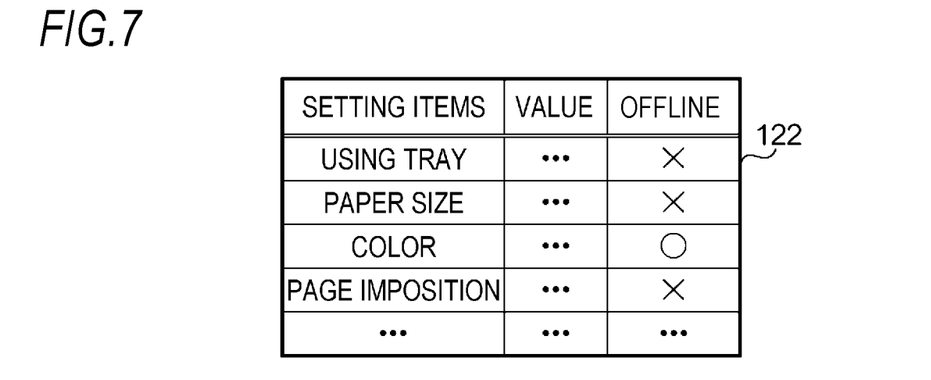
FIG. 7 is a view illustrating an example of setting information according to a modification.

FIG. 7 is a view illustrating an example of the setting information 122 according to this modification. The setting information 122 illustrated in FIG. 7 describes identification information indicating whether a setting has been received in the offline time period, for each of the setting items. For example, with regard to the setting item "PAPER SIZE" of the setting information 122 illustrated in FIG. 7, the "OFFLINE" field describes "x". This indicates that the setting for the "PAPER SIZE" has not been received in the offline time period. In addition, with regard to the setting item "COLOR" in the setting information 122 illustrated in FIG. 7, the "OFFLINE" field describes "o". This indicates that the setting for the "COLOR" has been received in the offline time period.

According to this configuration, since it is determined whether each of plural settings has been received in the offline time period, and a correction to the setting is urged, a user is not urged to correct a setting item set in the online time period when correcting a setting item set in the offline time period.

2-2. Modification 2

In the above-described exemplary embodiment, the identification information indicating whether a setting has been received in the offline time period is recorded in the setting information 122. Alternatively, the identification information may not be recorded in the setting information 122.

Figure 8:
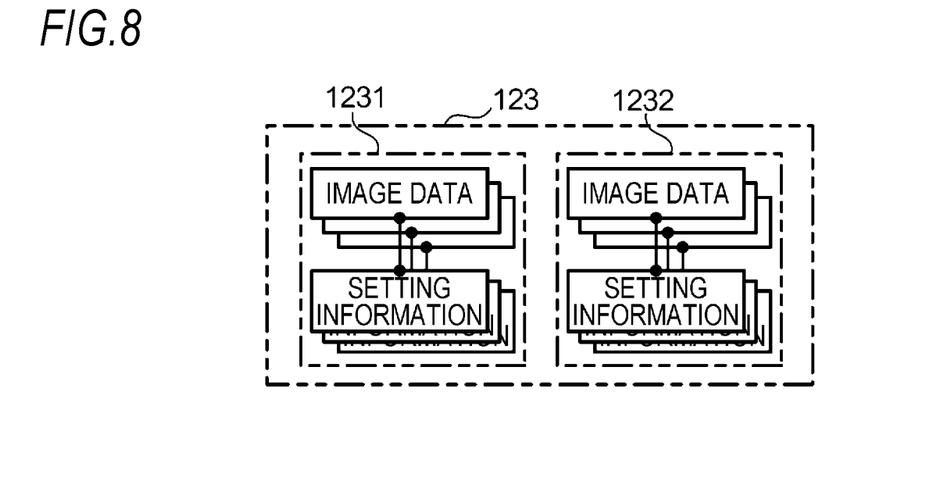
FIG. 8 is a view illustrating an example of a spool area according to a modification.

FIG. 8 is a view illustrating an example of the spool area 123 in this modification. The spool area 123 illustrated in FIG. 8 is divided into an offline reception area 1231 and an online reception area 1232. When a set of the image data 121 and the setting information 122 has been received in the offline time period, the controller 11 of the terminal 1 stores the set in the offline reception area 1231 of the spool area 123. Meanwhile, when the set of the image data 121 and the setting information 122 has been received in the online time period, the controller 11 stores the set in the online reception area 1232 of the spool area 123.

When an instruction of image formation is made for a set of the image data 121 and the setting information 122 stored in the online reception area 1232 of the spool area 123, the port monitor 127 implemented by the controller 11 determines in which of the offline reception area 1231 and the online reception area 1232 of the spool area 123 the set is stored. In a case where the set is stored in the offline reception area 1231, when transmitting the set to the server device 3, for example, before, after, or before and after a signal indicating the set, a code indicating that the signal has been received in the offline time period is added and transmitted to the server device 3.

When an instruction of image formation is made for plural sets, the port monitor 127 may add and transmit the above-described code before and after each of signals indicating the plural sets or before and after a group of the signals indicating the plural sets.

When the signal to which the above-described code has been added is transmitted, the controller 31 of the server device 3 stores the set of the image data 121 and the setting information 122 indicated by the transmitted signal, in the spool area 323. In this case, the spool area 323 may be divided in advance into the offline area and the online area. The controller 31 may determine which one of the divided areas the set indicated by the signal is stored in, depending on whether the code has been added to the received signal. In addition, when the code has been added to the signal, the controller 31 may add identification information to the setting information 122 included in the set indicated by the signal.

2-3. Modification 3

In the above-described exemplary embodiment, when identification information has been added to the setting that the transmitter 113 is to transmit, the notifying unit 114 notifies that the setting has been received in the offline time period. It should be noted that the timing of the notification is not limited thereto. For example, when the setting to which identification information has been added exists in the spool area 123, the notifying unit 114 may notify that the setting has been received in the offline time period, at a timing when the terminal 1 is able to communicate with the image forming apparatus 4 via the communication line 2 and the server device 3.

According to this configuration, when the status transitions from the offline state to the online state, a user may identify which setting has been received in the offline time period. Further, even without making an instruction of an image formation, the user may correct the setting based on the notification.

2-4. Modification 4

In the above-described exemplary embodiment, when it is determined that a setting associated with an instruction of image formation has been received in the offline time period, the controller 11 of the terminal 1 notifies the user that the setting has been received in the offline time period, by the display 14, and then, receives a correction to the setting. Alternatively, this correction may not be received. In this case, the user receives the notification and acquires an execution result of the image formation according to the instruction so that the user may recognize that the image formation has been executed by the setting received in the offline time period.

In addition, after notifying that the setting associated with the instruction of the image formation has been received in the offline time period, the controller 11 may inquire the user as to whether or not to cease the execution of the image formation.

2-5. Modification 5

In the above-described exemplary embodiment, the server device 3 and the image forming apparatus 4 are separate members from each other. Alternatively, the image forming apparatus 4 may be connected to the communication line 2 to communicate with the terminal 1 and may have the function of the server device 3. In this case, the image forming system 9 may not have the server device 3.

2-6. Modification 6

In the above-described exemplary embodiment, the terminal 1 acquires information of the status of the image formation of the image forming apparatus 4 by communicating with the image forming apparatus 4 via the communication line 2 and the server device 3. Alternatively, the terminal 1 may acquire the information from the image forming apparatus 4 without the server device 3. In this case, the image forming apparatus 4 may directly communicate with the terminal 1 by being connected to the communication line 2 or by a short range wireless communication.

2-7. Modification 7

The program executed by the controller 11 of the terminal 1 or the controller 31 of the server device 3 may be provided in a state of being stored in a computer readable recording medium such as a magnetic recording medium (e.g., a magnetic tape or a magnetic disk), an optical recording medium (e.g., an optical disc), a magneto-optical recording medium, or a semiconductor memory. In addition, the program may be downloaded via a communication line such as the Internet. In addition to the CPU, various devices may be applied as controllers such as the controllers 11 and 31, and for example, a dedicated processor is used.

2-8. Modification 8

In the above-described exemplary embodiment, the addition unit 112 is implemented when the controller 11 executes, for example, the printer driver 126. Alternatively, this function may be implemented by the controller 31 of the server device 3. In this case, the controller 11 may not have the function of the addition unit 112.

Figure 9:
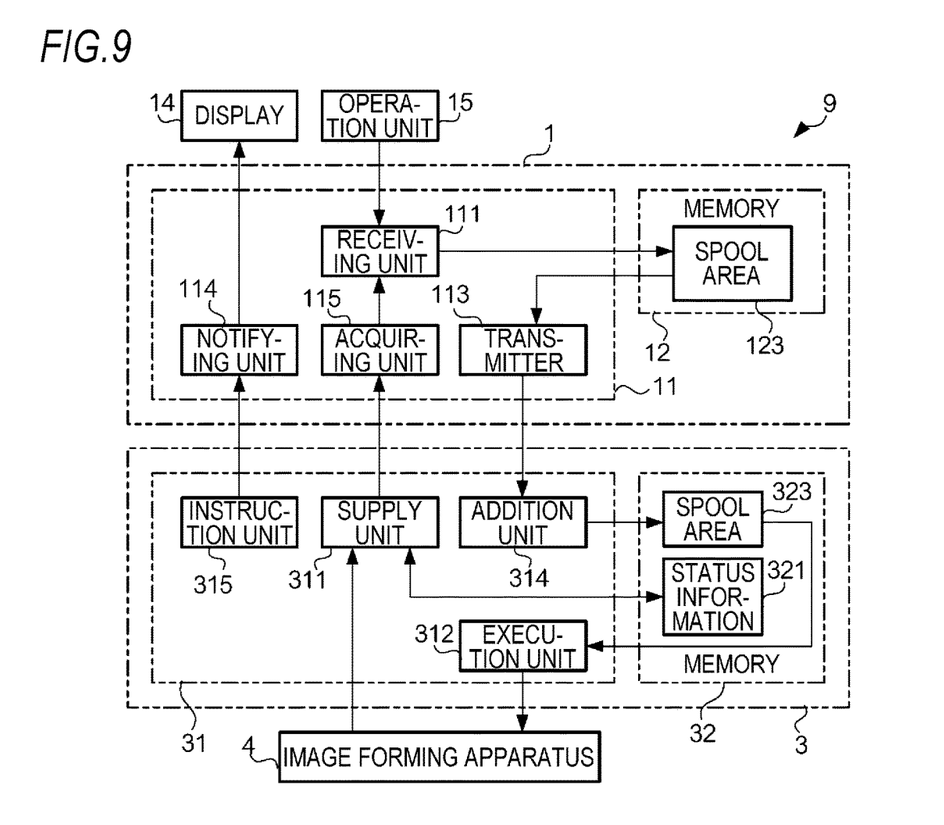
FIG. 9 is a view illustrating an exemplary functional configuration of an image forming system according to a modification.

FIG. 9 is a view illustrating an exemplary functional configuration of the image forming system 9 in the modification. The controller 11 of the terminal 1 functions as a receiving unit 111, a transmitter 113, a notifying unit 114, and an acquiring unit 115. The controller 31 of the server device 3 functions as a supply unit 311, an execution unit 312, an addition unit 314, and an instruction unit 315.

The receiving unit 111 receives an instruction of image formation of the image forming apparatus 4 and a setting for the image formation from a user, and generates the setting information 122 (not illustrated in FIG. 9) indicating the received setting. Then, the receiving unit 111 stores the generated setting information 122 and the image data 121 (not illustrated in FIG. 9) which is subject to the image formation by the received instruction in association with each other in the spool area 123.

The transmitter 113 reads the set of the instruction of the image formation and the setting for the image formation which are received from the user, from the spool area 123, and transmits the set to the server device 3.

When a request is received from the terminal 1, or a predetermined condition is met, the supply unit 311 inquires the status from the image forming apparatus 4 to acquire information, and generates status information 321 to store the information in the memory 32. In addition, the supply unit 311 supplies the status information 321 to the terminal 1. The acquiring unit 115 acquires the information supplied from the supply unit 311.

When the instruction of the image formation and the setting for the image formation, which are received in the time period during which the terminal 1 is unable to communicate with the image forming apparatus 4, are received from the terminal 1, the addition unit 314 adds identification information to the setting.

Not only the setting information indicating the setting to which the identification information has been added by the addition unit 314, but also the setting information indicating the setting to which no identification information has been added are stored in the spool area 323 in association with their target image data.

The execution unit 312 reads the set of the instruction of the image formation and the setting for the image formation which are transmitted from the terminal 1, from the spool area 323, to transmit the set to the image forming apparatus 4 and cause the image forming apparatus 4 to execute the image formation indicated by the instruction.

When identification information has been added to the setting that the execution unit 312 is to transmit, the instruction unit 315 instructs the terminal 1 to notify the user that the setting has been received in the time period during which the terminal 1 is unable to communicate with the image forming apparatus 4.

When an instruction is made from the instruction unit 315, the notifying unit 114 notifies that the setting of the image formation intended to be execute by the image forming apparatus 4 has been received in the offline time period. This notification is, for example, displayed on the display 14.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor configured to act as:
- a receiving unit that receives a plurality of settings for image formation of an image forming apparatus;
- an addition unit that adds identification information to the settings when the settings have been received in a time period during which it is impossible to communicate with the image forming apparatus;
- a transmitter that transmits an instruction of the image formation and the settings to the image forming apparatus; and
- a notifying unit that notifies that the settings have been received in the time period, when the identification information has been added to the settings that the transmitter is to transmit,
wherein the addition unit adds the identification information to each setting that has been received in the time period among the plurality of settings.

2. The information processing apparatus according to claim 1, wherein if the setting to which the identification information has been added exists, the notifying unit notifies that the setting has been received in the time period, at a timing when it becomes impossible to communicate with the image forming apparatus.

3. The information processing apparatus according to claim 2, wherein the receiving unit receives a correction to the setting after the notifying unit makes the notification.

4. The information processing apparatus according to claim 1, wherein the receiving unit receives a correction to the setting after the notifying unit makes the notification.

5. A server device comprising:
a processor configured to act as:
- an addition unit, wherein when (i) an instruction of image formation and (ii) a setting for the image formation which have been received in a time period during which an information processing apparatus is unable to communicate with an image forming apparatus are received from the information processing apparatus, the addition unit adds identification information to the setting;
- an execution unit that transmits the instruction of the image formation and the setting to the image forming apparatus to cause the image forming apparatus to execute the image formation indicated by the instruction; and
- an instruction unit that notifies a user that the setting has been received in the time period, when the identification information has been added to the setting that the execution unit is to transmit.

6. An image forming system comprising:
an image forming apparatus; and
an information processing apparatus that communicates with the image forming apparatus, wherein
the information processing apparatus includes
a processor configured to act as:
- a receiving unit that receives a plurality of settings for image formation of an image forming apparatus;
- an addition unit that adds identification information to the settings when the settings have been received in a time period during which it is impossible to communicate with the image forming apparatus;
- a transmitter that transmits an instruction of the image formation and the settings to the image forming apparatus; and
- a notifying unit that notifies that the settings have been received in the time period, when the identification information has been added to the settings that the transmitter is to transmit,
wherein the addition unit adds the identification information to each setting that has been received in the time period among the plurality of settings.

* * * * *